(Model.)

A. LEAS.
SCOOP BALANCE ATTACHMENT FOR WEIGHING SCALES.

No. 269,433. Patented Dec. 19, 1882.

WITNESSES:
J. D. Garfield
C. Sedgwick

INVENTOR:
A. Leas
BY Munn & Co
ATTORNEYS.

UNITED STATES PATENT OFFICE.

ASA LEAS, OF WEST MANCHESTER, OHIO.

SCOOP-BALANCE ATTACHMENT FOR WEIGHING-SCALES.

SPECIFICATION forming part of Letters Patent No. 269,433, dated December 19, 1882.

Application filed June 17, 1882. (Model.)

*To all whom it may concern:*

Be it known that I, ASA LEAS, of West Manchester, in the county of Preble and State of Ohio, have invented a new and Improved Scoop-Balance Attachment for Weighing-Scales, of which the following is a full, clear, and exact description.

My invention consists of a balance-attachment to platform weighing-scales, located under the platform, and so arranged that a rod extending from the bottom of the scoop, when placed on the platform, will be borne by the balance device in such manner that the scoop will be automatically counterbalanced without attention of the operator, and so as to dispense with the application of the balance-weight, in the use of which mistakes frequently occur through carelessness and forgetfulness of the operator, all as hereinafter fully described.

Reference is to be had to the accompanying drawings, forming part of this specification, in which similar letters of reference indicate corresponding parts in all the figures.

Figure 1:
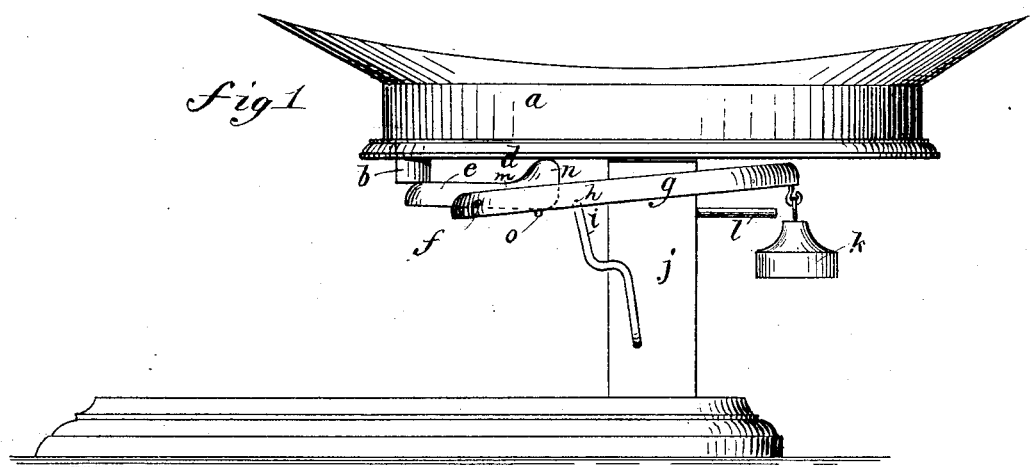
Figure 2:
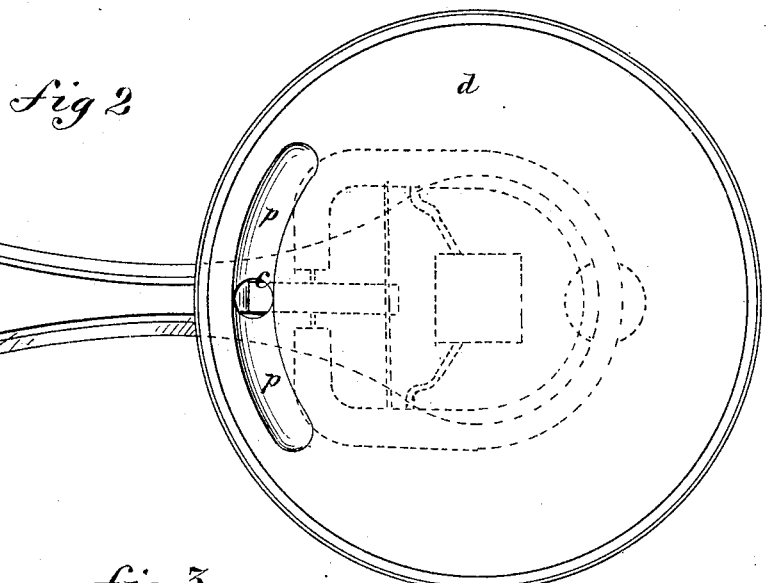
Figure 3:
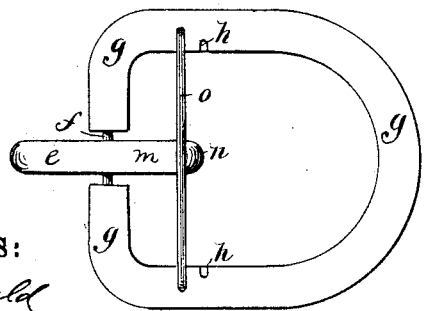

Figure 1 is a side elevation of the base, upright, and platform of a weighing-scale with my improved scoop-balance applied to said scale. Fig. 2 is a plan view of Fig. 1 with the scoop removed, and Fig. 3 is a bottom plan of the balance attachment.

The scoop $a$ has a rod or stud, $b$, extending downward from the bottom through a hole, $c$, in the platform $d$ of the scale, so as to rest on the arm $e$ of a lever pivoted at $f$ in a yoke, $g$, which is pivoted at $h$ to supports $i$, and extends around the standard $j$ of the scale, where it carries a counterbalance-weight, $k$, and over a rest, $l$, onto which the yoke falls when the scoop is removed from the platform $d$.

The arm $m$ of the lever on which the stud $b$ of the scoop rests has a boss, $n$, which bears against the under side of the platform $d$, so that the lever $e\ m$ will always preserve its horizontal position under the platform, and thus properly support it. The yoke $g$, supporting the fulcrum $f$ of the lever $e\ m$, and the counterpoise $k$ are to support said fulcrum $f$, so that the scoop will rest flat on the top of platform $d$. The hole in the platform $d$ for the stud $b$ serves for a guide by which to so place the scoop on the platform that said stud will rest properly on the lever $e\ m$; but I do not limit myself to that arrangement, for any other by which the same result can be obtained may be employed, and I do not limit myself to the method which I have shown for supporting the yoke $g$. The scale is used with this contrivance as is the ordinary balance beam-scale, except that the usual provision for balancing the scoop is not made; but my improvement avoids the necessity of applying a weight to the weight-hanger for balancing the scoop. In the ordinary beam-scale the lever is generally balanced for the platform, so that when it is desired to weigh anything in the scoop an additional balance is required for that, which may be forgotten, but which takes effect automatically in my invention.

In practice the yoke should be pivoted in line with the pivots of the balance-levers of the scale to work to the best advantage; but it is not absolutely essential. The rod $o$ serves for lever $e\ m$ to rest on when the scoop is removed from platform $d$. The grooves $p$ in the platform serve to guide the stud $b$ of the scoop to the hole $c$.

I may modify the form of the weight $k$ so far as to make it a part of the yoke, and to make it with a cavity in which to put shot or other small pieces for balancing, in case it may be required.

Having thus fully described my invention, I claim as new and desire to secure by Letters Patent—

1. The combination, with a scoop having the downward stud $b$, of a platform having a hole, $c$, and a groove, $p$, leading thereto, as and for the purpose specified.

2. The combination of a scoop-balance lever, $e\ m$, and a counterbalance-yoke, $g$, carrying weight $k$, with the platform $d$ and scoop $a$ of a weighing-scale, substantially as described.

3. The combination, with the platform $d$ of a weighing-scale, of a balance-lever, $e\ m$, located in relation to the platform for receiving a portion of the weight of the scoop on one of its arms, and bearing against the platform by its other arm to balance the weight of the scoop on the platform, said lever being pivoted on a weighted yoke, $g$, to allow the scoop to rest its whole base on said platform, substantially as specified.

4. In platform-scales, the combination, with a scoop having the downward stud $b$, and the platform $d$, having hole $c$, of a lever having an arm, $m$, to support said stud, and a boss, $n$, to bear against the platform, as shown and described.

5. In platform-scales, the rod $o$, arranged to support the lever $e$ when the scoop is removed, as described.

ASA LEAS.

Witnesses:
 A. E. MAY,
 JACOB BROWN.